United States Patent
Ramakrishnan et al.

(10) Patent No.: US 7,333,515 B1
(45) Date of Patent: Feb. 19, 2008

(54) METHODS AND APPARATUS TO IMPROVE STATISTICAL REMULTIPLEXER PERFORMANCE BY USE OF PREDICTIVE TECHNIQUES

(75) Inventors: Sangeeta Ramakrishnan, San Jose, CA (US); Fang Wu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1100 days.

(21) Appl. No.: 10/214,786

(22) Filed: Aug. 6, 2002

(51) Int. Cl.
*H04H 1/04* (2006.01)

(52) U.S. Cl. .................................................... 370/487

(58) Field of Classification Search ............... 370/487, 370/490, 468, 395.41, 477, 352, 395.21, 370/395.43, 437, 532, 537, 538, 540
See application file for complete search history.

(56) References Cited

U.S. PATENT DOCUMENTS

| | | | |
|---|---|---|---|
| 5,812,525 A * | 9/1998 | Teraslinna | 370/229 |
| 5,835,493 A * | 11/1998 | Magee et al. | 370/395.62 |
| 5,861,919 A | 1/1999 | Perkins et al. | |
| 5,862,140 A | 1/1999 | Shen et al. | |
| 6,192,083 B1 | 2/2001 | Linzer et al. | |
| 6,674,796 B1 * | 1/2004 | Haskell et al. | 375/240.01 |

OTHER PUBLICATIONS

International Organisation for Standardisation Organisation Internationale De Normalisation, "Generic Coding of Moving Pictures and Associated Audio", ISO/IEC JTC1/SC29/WG11/N0801, Nov. 13, 1994.
Huifang Sun, "Architectures for MPEG Compressed Bitstream Scaling", IEEE Transactions on Circuits and Systems for Video Technology, vol. 6, No. 2, Apr. 1996, pp. 191-199.
Wei Ding, "Joint Encoder and Channel Rate Control of VBR Video over ATM Networks", IEEE Transactions on Circuits and Systems for Video Technology, vol. 7, No. 2, Apr. 1997, pp. 266-278.

* cited by examiner

*Primary Examiner*—Chi Pham
*Assistant Examiner*—Alexander O. Boakye
(74) *Attorney, Agent, or Firm*—Beyer Weaver LLP

(57) ABSTRACT

The present invention relates to methods and apparatus for generating predicted data utilizing data gathered from portions of one or more bit streams present in a static buffer, or look-ahead window buffer over a first time period. By generating predicted data for the bit streams over a second time period, the present invention provides a longer "effective" look-ahead window buffer(s) time period without increasing system delay usually associated with increasing the "actual" look-ahead window buffer size.

31 Claims, 6 Drawing Sheets elementary video bit stream including
bit rate and/or other video information
400

METHODS AND APPARATUS TO IMPROVE STATISTICAL REMULTIPLEXER PERFORMANCE BY USE OF PREDICTIVE TECHNIQUES

FIELD OF THE INVENTION

The present invention relates generally to systems and apparatus for transmitting data. More specifically, the present invention relates to predictive techniques that provide improved statistical remultiplexer performance.

BACKGROUND OF THE INVENTION

Video services are provided by a wide array of video content suppliers. For example, residential digital video services may include digital television, video on demand, Internet video, etc.—each service having hundreds of programs. A program refers to one or more bit streams that are used to represent the video content and associated audio content.

A target receiver for the programs, such as a set-top box (STB) located in a residential home, receives video programs from a number of different video content suppliers via assorted transmission channels. Typically, the "last mile" of transmission between the video content suppliers and the target receiver is along the same transmission channel, requiring the channel to carry multiple video programs from the wide array of suppliers, and often simultaneously.

There are presently a variety of different communication channels for transmitting or transporting video data. For example, communication channels such as coaxial cable distribution networks, digital subscriber loop (DSL) access networks, ATM networks, satellite, terrestrial, or wireless digital transmission facilities are all well known. Many standards have been developed for transmitting data on the communication channels. For the purposes herein, a channel is defined broadly as a connection facility to convey properly formatted digital information from one point to another. A channel includes some or all of the following elements: 1) physical devices that generate and receive the signals (modulator/demodulator); 2) the medium that carries the actual signals; 3) mathematical schemes used to encode and decode the signals; 4) proper communication protocols used to establish, maintain, and manage the connection created by the channel; 5) storage systems used to store the signals, such as magnetic tapes and optical disks. The concept of a channel includes, but is not limited to, a physical channel, but also includes logical connections established on top of different network protocols, such as xDSL, ATM, IP, wireless, HFC, coaxial cable, Ethernet, and Token Ring.

The channel is used to transport a bit stream, or a continuous sequence of binary bits used to digitally represent compressed video, audio, and/or data. A bit rate is the number of bits per second that is required to transport the bit stream. A bit error rate is the statistical ratio between the number of bits in error due to transmission and the total number of bits transmitted. A channel capacity is the maximum bit rate at which a given channel can convey digital information with a bit error rate no more than a given value.

Since the amount of video data to be transmitted with existing communication channels is often excessive, compression is an approach that has been used to make digital video images more transportable. Digital video compression allows digitized video data to be represented in a much more efficient manner and makes it possible to transmit the compressed video data using a channel at a fraction of the bandwidth required to transmit the uncompressed video data. For example, a digitized video data having an uncompressed bit rate of roughly 120 million bits per second (Mbps) can be represented by a compressed bit stream having a bit rate of 4-6 Mbps. Compression represents significant data savings, which results in much more efficient use of channel bandwidth and storage media.

International standards have been created on video compression schemes. Examples of these standards include MPEG-1, MPEG-2, MPEG-4, H.261, H.262, H.263, etc. These compression standards rely on several algorithm schemes such as motion compensated transform coding, quantization of the transform coefficients, and variable length coding (VLC). In general, the number of bits used to represent a given image determines the quality of the encoded picture. The more bits used to represent a given image, the better the image quality. The system that is used to compress digitized video sequences using the above-described standards is typically called an encoder or encoding apparatus.

When the digital video is first compressed, the encoder assumes a particular bit rate profile, whether it is constant bit rate (CBR) or a variable bit rate (VBR). The word "profile" refers to the fact that transport bit rate may not be constant, but variable under certain constraints, such as peak bit rate, average bit rate, minimum bit rate, etc. For example, a constant bit rate stream at 4 Mbps does not have the same bit rate profile as a variable bit rate stream at an average of 4 Mbps but has larger maximum bit rate and smaller minimum bit rate, respectively.

The VBR representation of compressed video data allows a video encoder to generate compressed bit streams that, when decoded, produce consistent video quality. However, as a result of the compression process, the number of bits required to represent the compressed data differs widely from picture to picture. The specific VBR characteristics of the compressed bit stream depend on many factors including: the complexity of the video image and amount of motion in the video sequence; changes made in post-generation, such as scene cuts, fades, wipes, picture-in-picture, etc; and the amount of stuffing bits/bytes inserted into the bit stream. As channel capacities are often expressed as constant bit rates, the variable nature of VBR compressed bit stream often poses a problem for video transmission.

One potential consequence of exceeding channel capacity for a VBR compressed bit stream on a particular channel is compromised video quality. Commonly, if one or more bit streams contain too much data to fit within a channel, video data may be dropped from the bit stream or simplified to allow transmission, thus sacrificing end user video quality. Due to the real-time nature of compressed video transmission, dropped packets are not re-transmitted. Also, it is important to point out that compressed bit streams are usually generated by either real-time encoders or pre-compressed video server storage systems. Both are likely to be in a remote site, away from the network itself. This increases the difficulty in encoding the video signal with a resulting bit rate profile sensitive to the connection bandwidth available for a particular channel or target receiver.

To further reduce the excessive amount of video transmission, bit streams are frequently combined for transmission within a channel to make digital video data more transportable. A multiplex is a scheme used to combine bit stream representations of multiple signals, such as audio, video, or data, into a single bit stream representation.

One important benefit of the VBR compression is achieved through statistical multiplexing. Statistical multiplexing is an encoding and multiplexing process which takes advantage of the VBR nature of multiple compressed video signals. When a statistical multiplexer combines multiple bit streams, an algorithm may be used to adapt the bit rate of each VBR video signal but the total bit rate of the output multiplex is kept at a constant value. Statistical multiplexing encompasses multiplexing architectures having a reverse message path from the multiplexer to the encoders. This is also often referred to as closed-loop statistical multiplexing.

In applications such as video on demand, digital cable headend systems, and digital advertisement insertion systems, the requirement for the closed-loop feedback system may not provide the most optimum system efficiency, as program encoders from different providers may not be co-located. Thus, an open loop statistical multiplexing architecture, termed statistical remultiplexing, is typically used to multiplex the compressed signals and to improve the overall system efficiency, and to provide better bandwidth usage and reduced transmission cost. Statistical remultiplexing is a process which accepts multiple VBR bit streams and remultiplexes them together to output a single CBR bit stream that fits within an available channel.

FIG. 1 illustrates a prior art example of a compressed bit stream 100 having an MPEG-2 format. The MPEG-2 compression standard consists of two layers: a system layer 101 and an elementary stream layer 102. The elementary stream layer 102 typically contains the coded video and audio data and defines how compressed video (or audio) data are sampled, motion compensated (for video), transform coded, quantized and represented by different variable length coding (VLC) tables. The basic structure for a coded video picture data is a block that is an 8 pixel by 8 pixel array. Multiple blocks form a macroblock, which in turn forms part of a slice. A coded picture consists of multiple slices. Multiple coded pictures form a group of pictures.

Each block contains variable length codes (VLC) for transform coefficients. In the MPEG-2 syntax, the picture data section contains the bulk of the compressed video images. This is where the transform coefficients are encoded as VLCs. For a typical bit stream, this portion of the data takes somewhere between 70%-90% of the total bit usage of a coded picture, depending on the coded bit rate. The MPEG-2 syntax also specifies private user data fields within the elementary stream layer 102. The private user data fields may be either of variable length or fixed length.

The system layer 101 is defined to allow an MPEG-2 decoder to correctly decode audio and video data, and present the decoded result to the video screen in a time continuous manner. The system layer 101 comprises two sub-layers: a packetized elementary stream (PES) layer 104 and a transport layer 106 above the PES layer 104.

The PES layer 104 defines how the elementary stream layer is encapsulated into variable length packets called PES packets. In addition, the PES layer 104 includes presentation and decoding time stamps for the PES packets, which are used by a decoder to determine the timing to decode and display the video images from the decoding buffers.

The transport layer 106 defines how the PES packets are further packetized into fixed sized transport packets, e.g., packets of 188 bytes to produce a transport stream. Additional timing information and multiplexing information may be added in the transport layer 106. For example, transport packets may contain program clock reference (PCR) values, presentation time stamps (PTS) and decoding time stamps (DTS). PCR values are related to the encoder system time clock for a particular program. A PTS indicates the time when a video picture or audio frame should be displayed or presented relative to the PCR. A DTS indicates the time when a video picture should be decoded relative to the PCR. The transport layer 106 may be utilized as a transport stream or a program stream.

The transport stream is optimized for use in environments where errors are likely, such as transmission in a lossy or noisy media. Applications using the transport stream 106 include Direct Broadcast Service (DBS), digital or wireless cable services, broadband transmission systems, etc.

The program stream is designated for use in relatively error free environments and is suitable for applications that may involve software processing of system information, such as interactive multimedia applications. Applications using the program stream include Digital Versatile Disks (DVD) and video servers.

FIG. 2 illustrates a prior art example of a MPEG elementary video bit stream. The MPEG elementary video bit stream 200 includes start code indicating processing parameters for the bit stream 200 such as a sequence start code 202, a sequence extension including a user data header 203, a Group of Pictures (GOP) header 204, a user data header 205, a picture header 206, and a picture coding extension that includes a user data extension 207. Picture data 208 follows the picture header 206. The bit stream 200 includes a second picture header 210 preceding picture data 212.

Information in an MPEG-2 compressed bit stream also indicates the relationship between various frames within a picture. The access unit level information relates to coded pictures and may specify whether a picture is an intra frame (I frame), a predicted frame (P frame), or a bi-directional frame (B frame). An I frame contains full picture information. A P frame is constructed using a past I frame or P frame. A B frame is bi-directionally constructed using both a past and a future I or P frame, which are also called anchor frames.

FIG. 3 illustrates a prior art exemplary frame sequence 300 included in a compressed bit stream. The sequence 300 corresponds to a group of pictures in an MPEG-2 bit stream. The sequence 300 includes an initial I frame 302, P frames 304a-d and ten B frames 306a-j. The I frame 302 contains full picture information. The P and B frames are constructed from other frames as illustrated by arrows 308. Each P frame 304a-d is constructed using the I frame 302 or a previous P frame 304a-d, whichever immediately precedes the P frame (e.g., the P frame 304b uses the P frame 304a). The B frames 306a-j are bi-directionally constructed using the nearest past and future reference pictures. A reference picture is either an I or a P picture. For example, the B frames 306a and 306b are constructed using the past I frame 302 and future P frame 304a.

Some statistical remultiplexers rely on information solely contained in the pre-compressed bit streams for re-encoding. The information is usually obtained by decoding the signal back to the spatial domain (baseband). When the statistical remultiplexer is configured within a network device, such as a router or headend, decoding increases the complexity of the network device, slows transmission of the video data, and decreases transmission efficiency. Thus, in some compressed bit streams, a transport packet containing bit rate information and/or other data associated with the bit stream may be included in the bit stream by an encoder for extraction by a receiving statistical remultiplexer. An example of such a system is described in pending U.S. patent application Ser. No. 09/684,623, entitled "Methods and Apparatus for Efficient Scheduling and Multiplexing", filed Oct. 5, 2000, and which is hereby incorporated by reference.

FIG. 4 illustrates a prior art example of an MPEG elementary video bit stream 400 having embedded bit rate and/or other video related information 407. The MPEG elementary video bit stream 400 includes start code indicating processing parameters for the bit stream 400 such as a sequence start code 402, a sequence extension including a user data header 403, a Group of Pictures (GOP) header 404, a user data header 405, a picture header 406, and a picture coding extension that includes a user data extension 408. Picture data 412 follows the picture header 410.

The embedded data 407 may include bit rate data or other information associated with the bit stream 400. In other examples, the bit rate data and/or other video related information packet 407 may be located in different layers of the bit stream 400. When the compressed and multiplexed channels are received, for example, by a cable operator, the channels are usually "groomed" to remove unwanted or redundant programs. The groomed channels are then remultiplexed and output as a bit stream to a customer.

Generally, a statistical remultiplexer dynamically multiplexes the various VBR channels, groomed and/or ungroomed, into a single bit stream that can be output over a channel of a fixed bandwidth which may be viewed as a CBR channel. This is usually done by varying the bandwidth allocated to each VBR channel based on its current demands to maximize utilization of the allocated bandwidth.

Typically, the input channels to the remultiplexer have been multiplexed according to a known pattern, for example, time divisional multiplexing, so that the ordering of the associated channel packets can be delayed in a queue or buffer, and then resent. Most statistical remultiplexers first attempt to shift the bit rates of the selected channels in time to achieve a bit rate within the allowable output bandwidth and within an allowable time period. According to the MPEG-2 standard, there is a limitation on the size of a receiving decoder buffer. Thus, the time shift for a compressed bit stream is limited so that it shall not underflow or overflow a receiving decoder buffer after the time shifting. After the time shifting, if the bit rate is still larger than the allowable bandwidth of the output channel, the excess bits are either dropped out of the transmission, which usually results in a poorer quality transmission, or the statistical remultiplexer utilizes a bit reduction scheme to try and retain as much of the excessive bit rate transmission as possible to maintain the transmission quality. There are many bit reduction schemes utilized by various statistical remultiplexers.

Basically, the statistical remultiplexer bit rate reduction schemes process portions of a bit stream to reduce the bit so that the overall output bandwidth is within the allocated bandwidth. These bit rate reduction schemes typically require the decoding, bit rate reduction, and then re-encoding of the bit stream. The processing step can usually be repeated until the output is within the allocated output bandwidth. The obvious goal of the bit rate reduction schemes is to reduce the overall output bit rate to within the allowable bandwidth of the output channel and still produce an output transmission that is as close to input quality as possible and with as little delay as possible.

FIG. 5 illustrates a general high level architecture of a statistical remultiplexer in the prior art. Generally, a statistical remultiplexer and its components perform steps to ensure that the bandwidth of the output transport medium is fully utilized. An example of a statistical remultiplexer is described in co-pending U.S. patent application Ser. No. 09/514,577, entitled "System and Method For Multiple Channel Statistical Re-Multiplexing", filed Feb. 28, 2000, and which is hereby incorporated by reference.

Typically, a plurality of compressed bit streams 502 and 504 are input to the statremux 506 after being initially processed, such as by demultiplexing, decoding and splitting. The bit streams 502 and 504 are input to a bit stream analyzer 508 which parses the bit streams to determine the bit usage of each of the channels for some pre-determined amount of time, T, ahead of what is currently being sent, in order to decide the incoming and outgoing bit rate for each bit stream. This is termed a look-ahead windowing technique. This technique involves buffering of the bit stream data up to some amount of time, T. The bit stream analyzer 508 inspects portions of the input compressed bit stream 502 and 504 held in the buffer(s), e.g., look-ahead window buffer(s), to extract information that can be used to assist the re-encoding process and bandwidth allocation. The information may include: bit rate, average bandwidth, peak bandwidth, instantaneous bandwidth, rate of change of instantaneous bandwidth, long term average bandwidth, long term variance of bandwidth, and video specific data, such as, decoding time (DTS) of each picture; number of bits used for each of the coded pictures, picture coding type, average quantizer scale value for each of the coded pictures, whether the coded picture is coded due to fade or scene cuts in the original video sequence, etc.

The bit stream analyzer 508 provides this information to the rate controller 510 to determine the amount and type of compression that the re-encoder 512 should perform on the bit streams 502 and 504, including bit rate reduction, if needed. The rate controller 510 uses this information to shuffle the portions of the bit streams present in the bit stream analyzer 508 to attempt to maximize the bit stream on the output channel before resorting to a bit rate reduction process, if needed. Shuffling of the bit streams is possible due to knowledge of the DTS of the all the coded pictures and the current decoder buffer for every channel.

The bit stream analyzer 508 outputs the bit streams to the re-encoder 512. The re-encoder 512 compresses the bit streams using conventional methods, such as motion compensation encoding, transform coding, quantization, and variable length encoding. The re-encoder 512 may also be able to perform any of the various types of compression in response to control signals from the rate controller 510.

The rate controller 510 specifies a bit rate for the bit stream output by the re-encoder 512. The rate controller 510 receives data from the bit stream analyzer 508, specifies what bit rates are possible, and in response to signals from the scheduler/multiplexer 514, provides commands to the re-encoder 512 to perform compression that will achieve a desired bit rate, which may include implementation of various bit rate reduction processes.

The scheduler/multiplexer 514 serves as a bandwidth allocator mechanism and controls bandwidth allocated to each of the bit stream channels to ensure that it fully utilizes the capacity of the output channel 530. The first-in/first-out (FIFO) buffers 518 and 520 temporarily store the data from the re-encoder 512 until the data can be scheduled for output through the multiplexer 522. The controller/scheduler 516 sends signals to the multiplexer 522 to control data flow from the FIFO buffers 518 and 520 into the multiplexer 522. Additionally, the filler packet adder 526 may be used to add null packets, packets containing stuffing bytes, or opportunistic data, such as program identification numbers and user information, for the times when the compressed data is insufficient to maintain a constant output bit rate over the output channel. The multiplexer 522 multiplexes the bit streams and outputs the resultant single bit stream to the decoder buffer model 524. The decoder buffer model 524 models a receiving decoder buffer and assists in regulating the bit streams to prevent an underflow or overflow of the bit stream to a receiving decoder. Also, the decoder buffer model can feedback the future bit rate requirements to the rate controller to prevent a decoder buffer model violation.

In theory, by increasing the look-ahead window buffer(s) size, a statistical remultiplexer can improve its performance by more accurately allocating the bandwidth. However, increasing the look-ahead window buffer(s) size increases the amount of data that is stored and processed. As a result, improving the accuracy with which bandwidth is allocated introduces an undesirable delay into the statistical remultiplexing system.

In view of the above, it would be desirable to improve the statistical remultiplexer performance without increasing the delay typically present in a statistical remultiplexing system.

SUMMARY OF THE INVENTION

The present invention overcomes the deficiencies and limitations of the prior art with systems and methods for scheduling and remultiplexing compressed bit streams including video data by predicting an effectively longer look-ahead window buffer(s) time period using bit rate related data obtained from a portion of one or more bit streams held in an actual look-ahead window buffer(s).

Predicting data ahead of time can be used to improve the scheduling and remultiplexing efficiency of compressed bit streams including video data and thus improve transmission efficiency of compressed video data over communication channels at bit rates that comply with the available bandwidth of the channels, typically without increasing the delay. In some embodiments, the predicted data may be used to reduce the system delay and maintain the remultiplexer performance.

In one aspect, the present invention relates to a network device for providing a remultiplexed compressed bit stream including video data. The network device includes at least one buffer for receiving at least a portion of one or more compressed bit streams, the at least one buffer being adapted for temporarily holding the portion of the one or more compressed bit streams; a data gathering module for gathering first data related to the portion of the one or more compressed bit streams present in the at least one buffer over a first time period; and a predictor coupled to the data gathering module, the predictor being adapted for generating second data related to the portion of the one or more compressed bit streams over a second time period, wherein the second data is generated using the first data, thereby enabling bandwidth to be allocated to the one or more compressed bit streams based upon the first and second data.

In another aspect, the present invention relates to a method for allocating bandwidth in a network device, including: receiving at least a portion of one or more bit streams into a buffer, the buffer for temporarily holding a portion of the one or more bit streams over a first time period; gathering first data related to the portion of the one or more bit streams present in the buffer over the first time period; and generating second data related to the portion of the one or more bit streams over a second time period using the first data, thereby enabling bandwidth to be allocated to the one or more bit streams based upon the first and second data.

In yet another aspect, the present invention relates to a computer readable medium containing executable computer program instructions which when executed by a digital processing system cause the system to perform a method for allocating bandwidth in a network device, including: instructions for receiving at least a portion of one or more bit streams into a buffer, the buffer for temporarily holding a portion of the one or more bit streams over a first time period; instructions for gathering first data related to the portion of the one or more bit streams present in the buffer over the first time period; and instructions for generating second data related to the portion of the one or more bit streams over a second time period using the first data, thereby enabling bandwidth to be allocated to the one or more bit streams based upon the first and second data.

These and other features and advantages of the present invention will be described in the following description of the invention and associated figures.

DETAILED DESCRIPTION OF THE PREFERRED EMBODIMENTS

Figure 1:
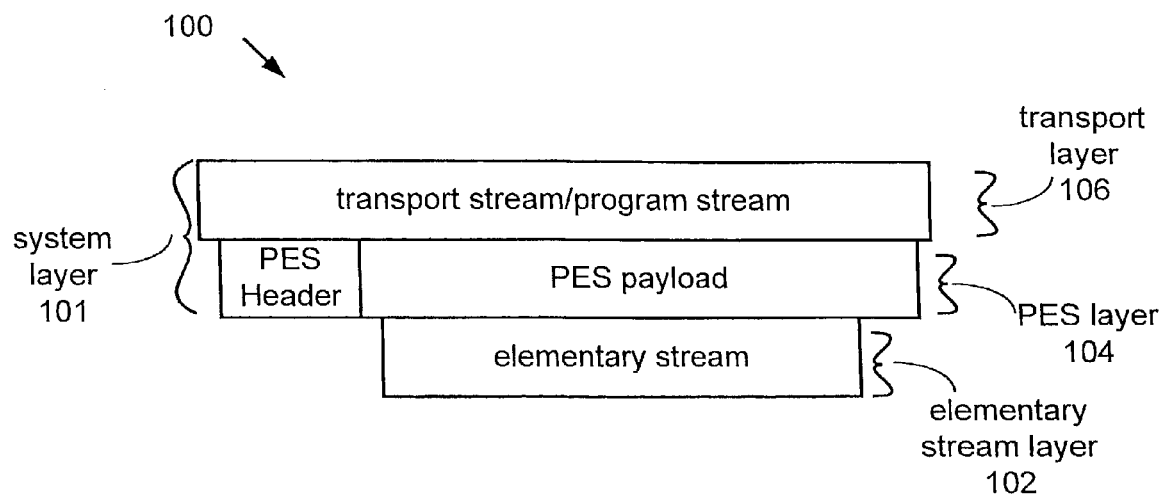
FIG. 1 illustrates a prior art example of a compressed bit stream 100 having an MPEG-2 format.
Figure 2:
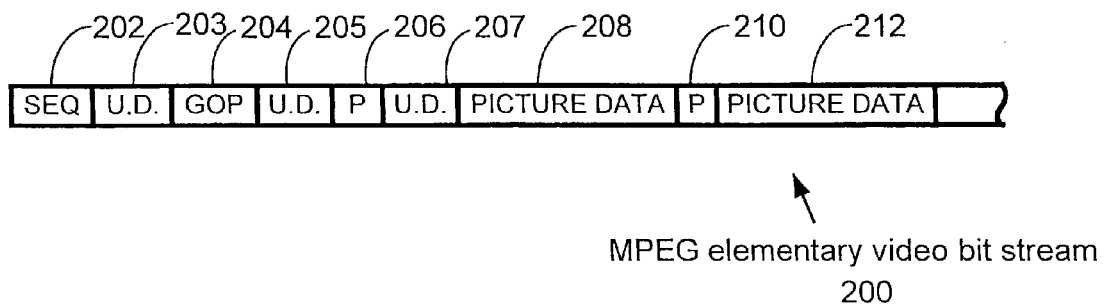
FIG. 2 illustrates a prior art example of a MPEG elementary video bit stream.
Figure 3:
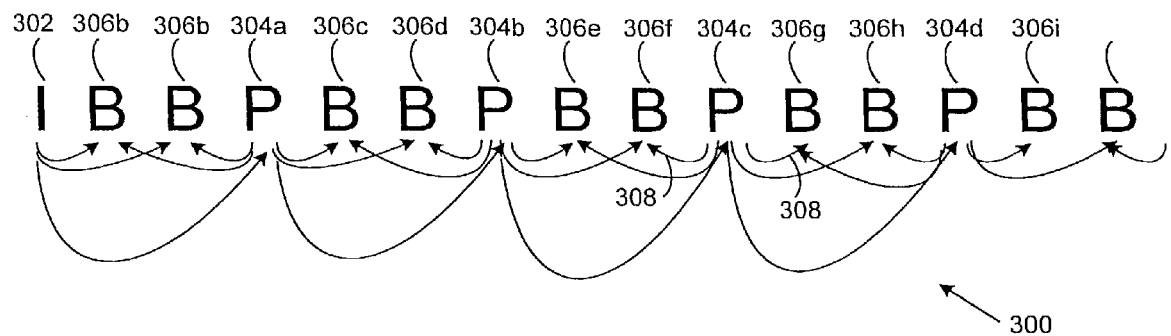
FIG. 3 illustrates a prior art exemplary frame sequence 300 included in a compressed bit stream.

The present invention will now be described in detail with reference to a preferred embodiment thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

While the present invention is described herein with reference to MPEG-2, it will be appreciated by those of skill in the art that the present invention may also be applied to MPEG-1, MPEG-4, H261, H263, etc, which are all DCT-based compressions standard. The MPEG-1 standard is described in ISO/IEC International Standard 11172, November 1993 which is herein incorporated by reference; the MPEG-2 standard is described in ISO/IEC International Standard 13818, November 1994 which is herein incorporated by reference; and the MPEG-4 standard is described in ISO/IEC International Standard 14496-2 March 2000 which is herein incorporated by reference.

The present invention provides methods and apparatus to further enhance the performance of a statistical remultiplexer by predicting effectively "longer" look-ahead window buffer data on the input bit streams using data obtained from portions of the bit streams present in the actual look-ahead window buffer(s). More particularly, the present invention provides methods and apparatus wherein the performance of a statistical remultiplexer can be improved by predicting effectively "longer" look-ahead window buffer data using data obtained from bit streams (e.g., portion of a bit stream or compressed bit stream) held in the actual look-ahead window buffer(s), thus, providing improved bandwidth allocation while retaining the same look-ahead window buffer(s) size and delay. Alternatively, the performance of the statistical remultiplexer can be improved by using a smaller look-ahead window buffer(s) size, and predicting a larger "effective" look-ahead window buffer(s) using data obtained from bit streams held in the smaller look-ahead window buffer(s), thus reducing delay.

The present invention also provides a predictor apparatus which utilizes the methods of the present invention to examine the bit related data and/or statistics of each compressed bit stream to predict the future needs of the bit stream.

Further, the present invention provides a method to examine the combined statistics of all the bit stream channels to predict the future total bandwidth requirements. Some of the statistics used to predict the needs of a channel may include: average bandwidth; peak bandwidth needs of a channel; instantaneous bandwidth needs of a channel; rate of change of instantaneous bandwidth needs of channels; long term average bandwidth needs of a channel; long term variance of bandwidth needs of a channel; and video specific information. Video specific information may include, for instance, frame type, frame size, frame transmission rates (e.g., according to frame type), frame transmission patterns, presence of stuffing data bits, and other timing information.

Figure 4:
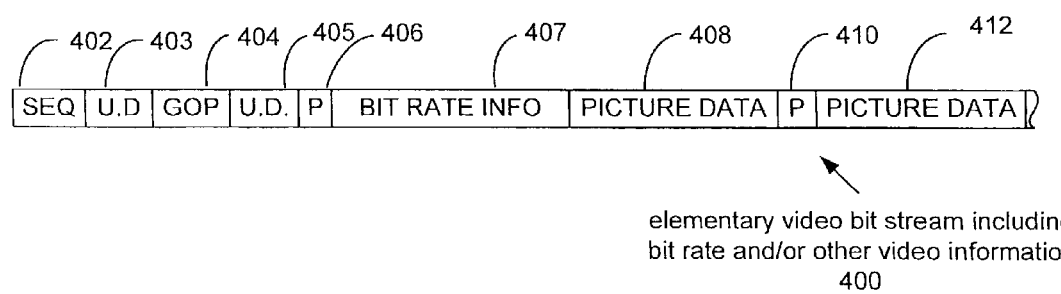
FIG. 4 illustrates a prior art example of an MPEG elementary video bit stream 400 having embedded bit rate data and/or other video related information 407.

As earlier described, a statistical remultiplexer typically receives compressed bit streams that have been encoded and/or multiplexed first elsewhere. In some instances, as discussed with reference to FIG. 4, the bit streams may include embedded information that provides bit rate and/or other bit stream related data. It will be appreciated, that the present invention may be utilized with bit streams that include or do not include the embedded information.

Figure 6:
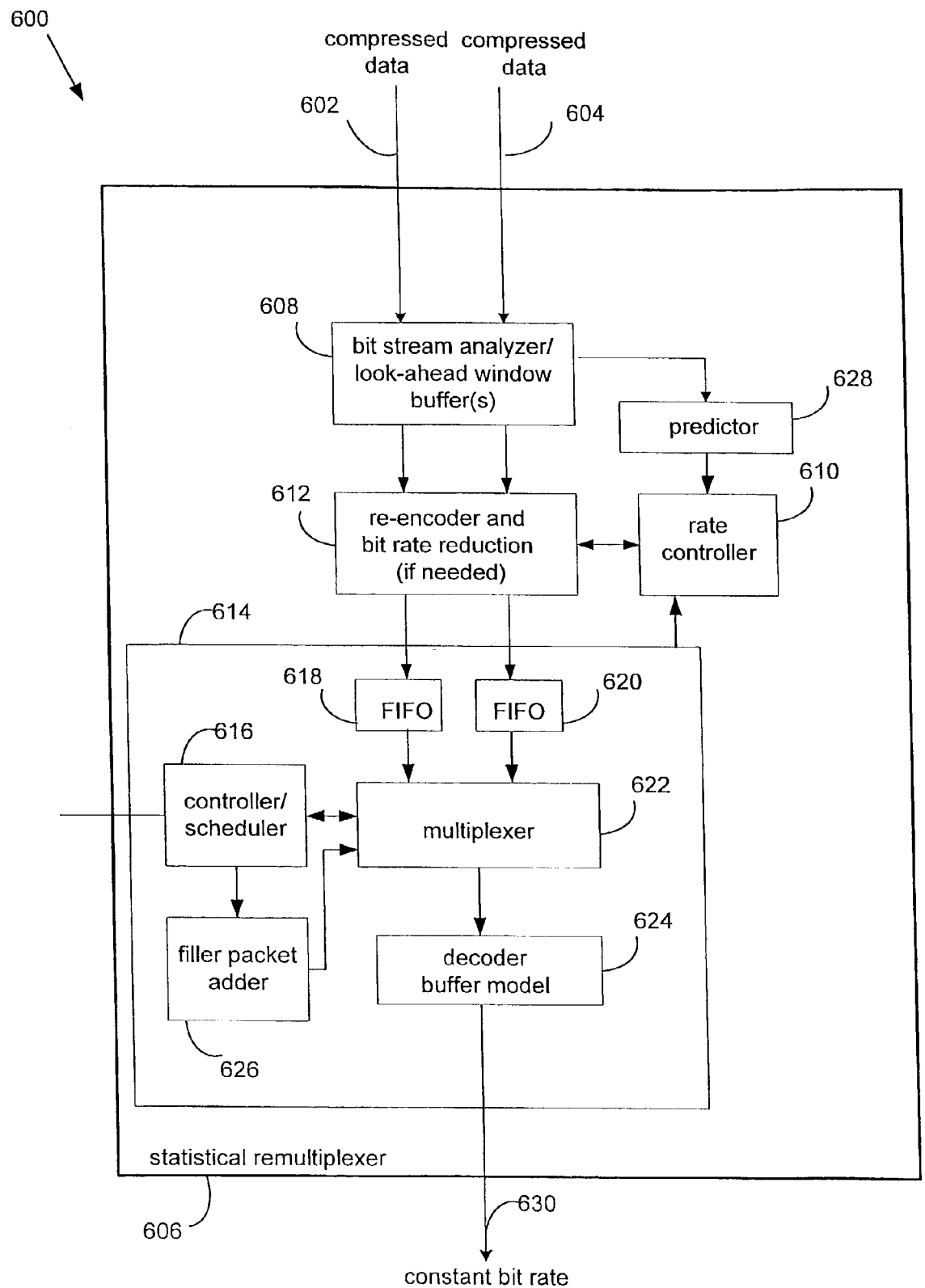
FIG. 6 illustrates statistical remultiplexer 600 including a predictor according to one embodiment of the present invention.

FIG. 6 illustrates a statistical remultiplexer 600 including a predictor according to one embodiment of the present invention. It will be appreciated that the statistical remultiplexer 600 in which the predictor 628 is utilized may have a wide variety of configurations and may include a wide variety of different mechanisms to allow processing of the compressed bit streams for output over a channel as a single bit stream. Thus, in these other embodiments, the statistical remultiplexer may include fewer or additional components.

The statistical remultiplexer 606 receives a plurality of input bit streams 602 and 604 using suitable receiving components. Of course, the present invention may also be implemented using a single compressed bit stream.

Figure 5:
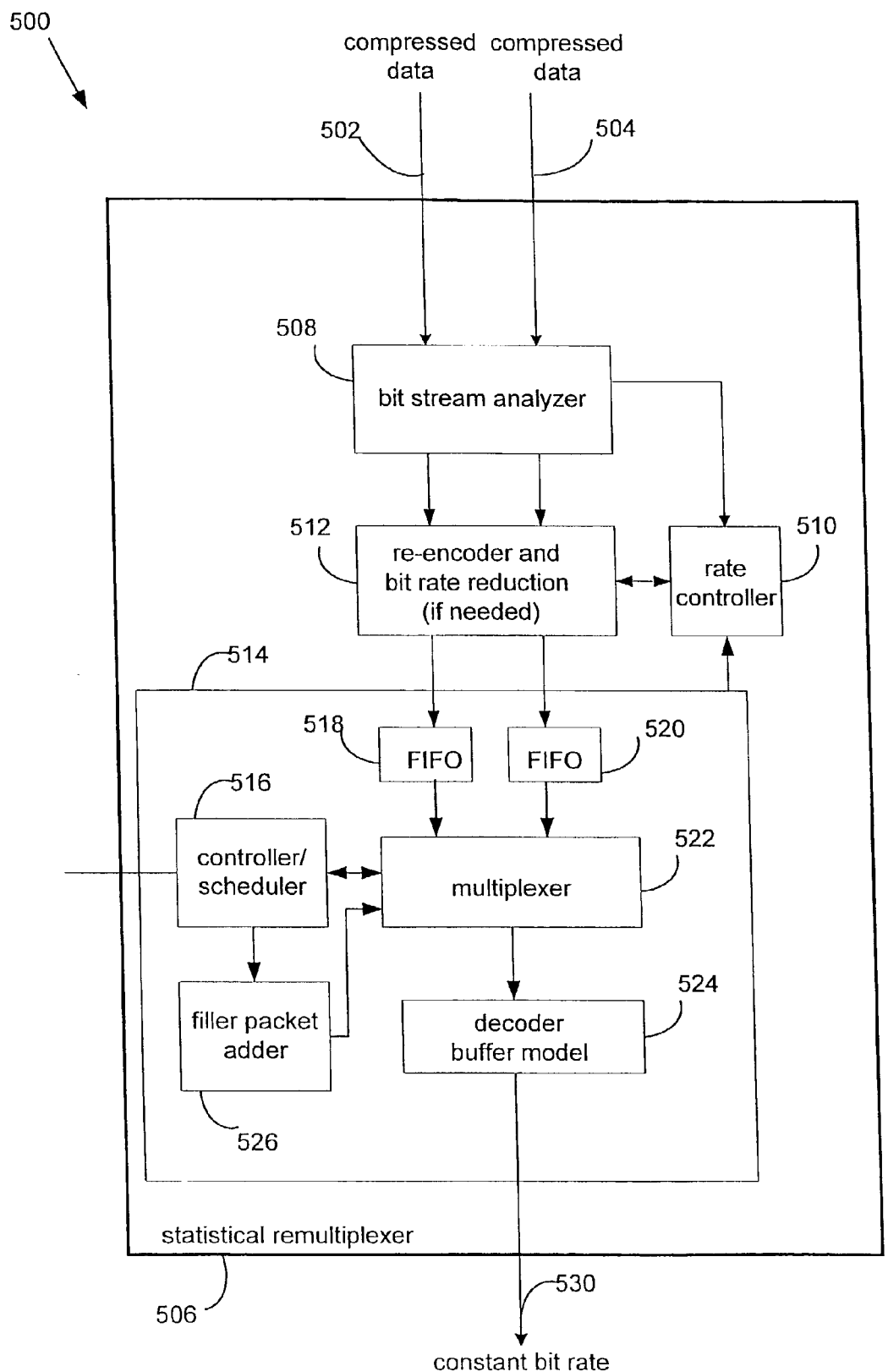
FIG. 5 illustrates a general high level architecture of a statistical remultiplexer in the prior art.

As earlier described with reference to FIG. 5, input bit streams 602 and 604 may initially be processed and groomed, such as by demultiplexing, decoding and splitting, before being transmitted to a bit stream analyzer 608. As earlier discussed with reference to FIG. 5, the bit stream analyzer 608 servers as a look-ahead window buffer(s) by temporarily holding portions of each bit stream to enable data to be gathered on each of the bit streams. This data may include, for example: decoding time (DTS) of each picture; number of bits used for each of the coded pictures, picture coding type, average quantizer scale value for each of the coded pictures, whether the coded picture is coded due to fade or scene cuts in the original video sequence, etc. This first data is then communicated to or obtained by the predictor 628 of the present invention.

Figure 7:
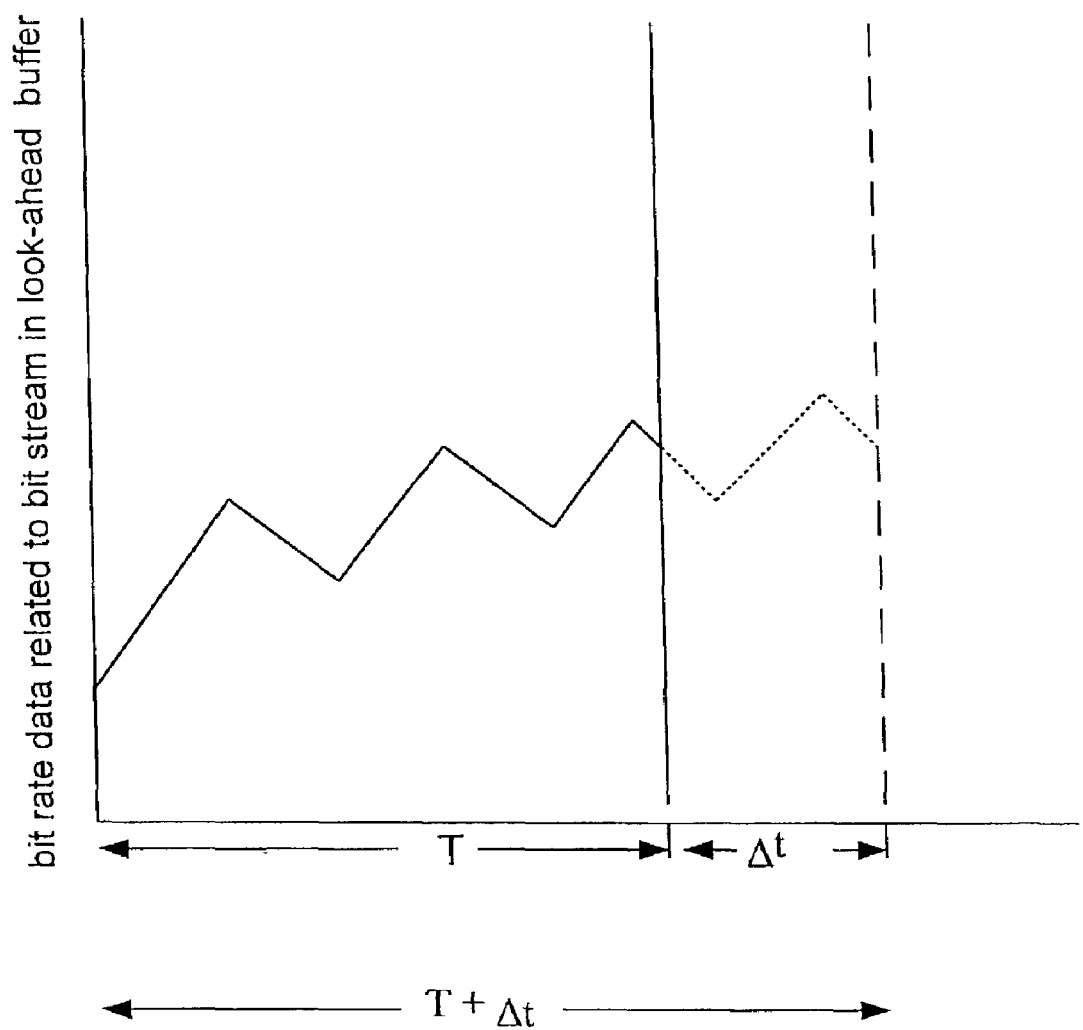
FIG. 7 is a graphical illustration of a method in which predicted data is calculated for bit streams for a time period, $\Delta t$, using data gathered on bit streams over an actual time period, T, according to one embodiment of the present invention.
Figure 8:
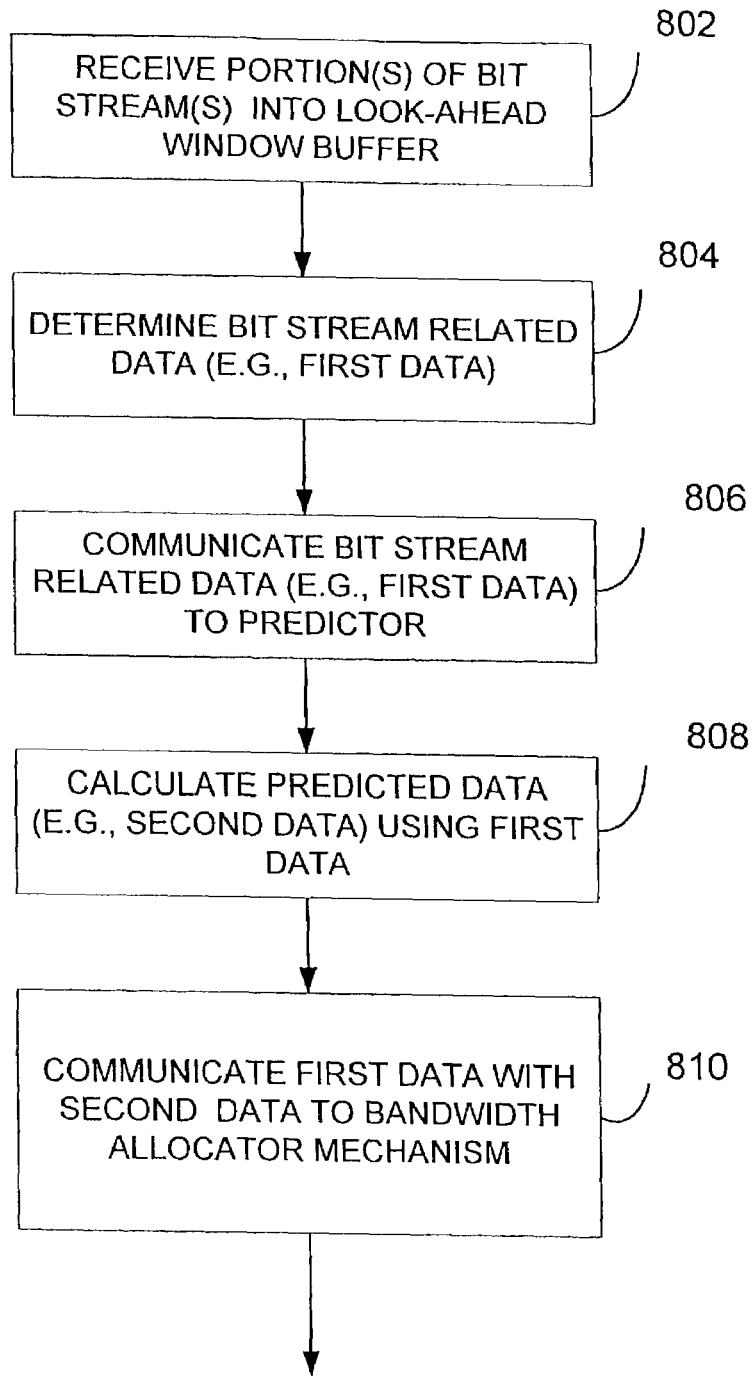
FIG. 8 is a flow diagram illustrating a method for predicting data such as statistical data (e.g., bit rate) associated with one or more bit streams for a specified time frame, $\Delta t$, based on data obtained from the one or more bit streams present in a look-ahead window buffer over a time period, T, according to one embodiment of the present invention.

Using the methods of the present invention further discussed herein with reference to FIGS. 7 and 8, the predictor 628 utilizes the first data gathered from the portions of the bit streams held in the look-ahead window buffer(s), e.g., the bit stream analyzer 608, to calculate predicted data associated with each of the bit streams over some extended time period, $\Delta t$.

The first data and the predicted data are then communicated to the bandwidth allocation mechanism of the statistical remultiplexer 606, e.g., the scheduler/multiplexer 614, for use in allocating bandwidth to the bit streams channels on the output channel 630.

In other embodiments, in which an extractor mechanism is present in the statistical remultiplexer, the extracted data may also be communicated to the predictor 628 for use in calculating the predicted data.

The scheduler/multiplexer 614 then determines allocation of the bit stream channels over the output channel 630.

FIG. 7 is a graphical illustration of a method in which predicted data is calculated for bit streams for a time period, $\Delta t$, using data gathered on bit streams over an actual time period, T, according to one embodiment of the present invention.

In the present embodiment, the bit stream analyzer 608, or mechanism utilizing a look-ahead windowing technique, gathers bit-stream related data associated with the portions of the bit streams held in a buffer over some actual time frame, T, e.g., first data. The time frame, T, can vary widely dependent upon the buffer size of the particular statistical remultiplexer. Similarly, the time frame, T, may be an instantaneous time. The first data is then used, for example, by the predictor 628, to calculate second data which predicts an expected behavior of each of the bit streams over a subsequent time frame, $\Delta t$. In this way, the actual time frame, T, together with the predicted time frame, $\Delta t$, provide a longer "effective" time frame. Recall that, in some embodiments, the first data may also include data obtained by an extractor mechanism, or by other data gathering modules associated with look-ahead windowing techniques.

In one embodiment, predicted data may be used to improve the performance of the statistical remultiplexer by increasing the "effective" length of the look-ahead window buffer(s) while maintaining the same delay. For example, bit rate related first data may be gathered on portions of each bit stream over an actual time, T, with a system delay, X. This first data is then used by the predictor 628 to estimate the bit rate requirements over a time, $\Delta t$. The "effective" look-ahead window buffer time period is now, T+$\Delta t$, e.g., a longer look-ahead window buffer, but with the same system delay, X. Thus, the data provided to the bandwidth allocator mechanism, e.g., scheduler/multiplexer 614, should now provide a better estimate of the bandwidth required by each of the bit streams.

Alternatively, the predicted data can be used to improve the performance of the statistical remultiplexer by maintaining the "effective" length of the look-ahead window buffer and reducing the system delay. In this embodiment, the initial length of the look-ahead window buffer may be a time, T, having a system delay of X. The actual look-ahead window buffer length may be reduced by some Δt, so that the resulting actual look-ahead window buffer is T−Δt, with a resulting reduction in system delay of X−Δx. The data gathered on the bit streams, over the reduced time period, T−Δt, is then used to calculate predicted data for the time frame Δt, to produce an effective time frame of T. Thus, the first data gathered over the smaller look-ahead window buffer length, T−Δt, and the predicted data for the time frame, Δt, are combined to provide data on the bit streams over a time, T.

In some embodiments, the predictor 628 may communicate the first data and the predicted data to the bandwidth allocator mechanism, e.g., the scheduler/multiplexer 614, for use in allocating the output channel bandwidth among the bit streams. In other embodiments, the first data and the predicted data may be combined, so that only the "effective" look-ahead window buffer(s) data is communicated to the bandwidth allocator.

Generally speaking, the predicted data (e.g., bit rate and/or bit rate related data) generated by the methods and apparatus of the present invention, may be used in different ways, depending on the type of data utilized and particular bandwidth allocation scheme. For example, in statistical remultiplexing of multiple MPEG-2 bit streams, predicted data, such as picture coding type and picture coding size information, special effect information, GOP size, motion measure information, complexity measure information, quantization measure, and number of coded macroblocks information, may be used during scheduling.

More specifically, predicted data relating to picture coding type (I, P, or B pictures) and picture coding size information (number of bits used in coding this picture) can be used to determine how much re-encoding or transcoding is necessary on a bit stream. Predicted data relating to special effect information can also be provided to the bandwidth allocator, and may reduce or eliminate the need for the often expensive processing required to obtain special effect information.

FIG. 8 is a flow diagram illustrating a method for predicting data such as statistical data (e.g., bit rate) associated with one or more bit streams for a specified time frame, Δt, based on data obtained from the one or more bit streams present in a look-ahead window buffer over a time period, T, according to one embodiment of the present invention. The time, T, may be a time period of some length, as well as, instantaneous. The flow begins at process 802 by receiving at least a portion of one or more bit streams (e.g., compressed bit streams) from one or more sources into the look-ahead window buffers(s) of the bit stream analyzer, or other look-ahead window buffer(s) mechanism of a statistical remultiplexer. In one embodiment, at least one of the compressed bit streams has a variable bit rate profile. As earlier discussed, the bit streams may be initially preprocessed, for example, by demultiplexing, decoding, and splitting.

At process 804, first data (e.g., frame size, bit rate and/or bit rate related data) is gathered on portions of the bit streams in the look-ahead window buffer(s) by the bit stream analyzer or other look-ahead windowing techniques. The first data is related to the portions of the bit streams present in the bit analyzer buffer, e.g., look-ahead window buffer, over a time period, T. As earlier described, this data can vary widely and may include, for example, frame size, bit rate, average bandwidth, peak bandwidth, instantaneous bandwidth, rate of change of instantaneous bandwidth, long term average bandwidth, long term variance of bandwidth, and video specific data bit rate data, such as frame type and timing data.

At process 806, the first data is transmitted to or obtained by the predictor.

At process 808, using the first data, the predictor generates predicted data, e.g., second data, for a time period, Δt, subsequent to the first time period, T. For instance, the predictor may calculate a predicted frame size, bit rate or other bit rate related data for each of the bit streams over some time, Δt. This predicted, or second, time period may be instantaneous, as well as a longer period of time. It will be appreciated that although time is used as the measure for both T and Δt, in one embodiment of the present invention, described herein, frame times may be used.

In one embodiment, the following methods may be used in predicting I, B, and/or P frame sizes, for example, in terms of number of bits. The following examples, will be described in terms of an I frame size for clarity, however, it will be appreciated that the methods are applicable to predicting P and B frame sizes as well. In this embodiment, an I frame size is predicted one frame time subsequent to the actual measured frame times used in calculating the predicted frame size. Thus, in this example, the frame size of one I frame is predicted for one frame time subsequent to I(t). According to the present embodiment:

$$I^P(t+1) = Avg(I(t-T), \ldots I(t))$$

According to the present method, I(t) represents the I frame size at frame time t, where the variable t represents the current discrete time slot for every frame time. For example, typically, frames are run at a specified rate, such as 30 frames per second. Thus, each frame would occupy ⅟30 of a second. Each of these time increments can be viewed as a time slot such that the frame which occupies the first thirtieth of the second is frame time 1, the second frame occupying the second thirtieth of the second is frame time 2, and so forth. For example, t=200 would indicate the twohundredth frame time.

The variable T represents a predictive window length. In the present example, T is the number of actual frame times to be used in calculating a predicted frame size. For example, T=60 would mean that the frame sizes occurring during the latest sixty (60) frame times would be used to predict the frame size of a next I frame time. Thus, for example, if t=200 and T=60, predictive window length would be frame times 141 through 200 and the frame size of all I frames occurring during that predictive window length would be used in predicting the next I frame size.

$I^P(t+1)$, the predicted I frame size at t plus one frame time is calculated as the mathematical average of the I frame sizes for the I frames occurring during the frames times t−T through time frame t. As earlier discussed, the method may also be applied in calculating $P^P(t+1)$ and $B^P(t+1)$.

In a second embodiment, a predicted I frame size can be calculated using a method that utilizes information related to scene cuts. Assuming the premise that pictures shot in the same scene background are highly related, the sizes of these pictures can be easier to predict once a scene cut is identified. One method that can be used to identify a scene cut is by detecting breakage of the GOP structure.

More and more video encoders break the GOP structure and force the encoder to generate an I-frame when a new scene starts. By taking advantage of this easily identifiable indicator, when analyzing the bit stream, if there is an irregular GOP structure, namely an I-frame occurs irregularly, then there is a scene change which at least the input encoder interprets as a scene cut, or the scene cut information could be extracted from information embedded in the bit stream.

Using the scene cut information, the following formula can be used for predicting the frame size $I^P(t+1)$:

$$I^P(t+1)=AvgI(t-T'), \ldots I(t))$$

$$T'=t-t_{cut}, \text{ where } T'<T$$

In this method, the predictive window length is shortened due to the occurrence of a scene cut at frame time $t_{cut}$. Another variable T' is used rather than T where $T'=t-t_{cut}$. For example, assume t=200 and T=60, and a scene cut occurs at frame time 169, or rather $t_{cut}$=169, then T'=200−169=31. Thus, rather than calculating the predicted frame size using a predictive window length of 60 frame times, i.e., 141 through 200, the predicted frame size is calculated using a predictive window length of 31 frames, frame times 170 through 200. This method ignores frame size data associated frame times prior to the scene cut in predicting the frame size of a predicted frame time subsequent to the scene cut. As earlier discussed, this method may also be applied in calculating $P^P(t+1)$ and $B^P(t+1)$.

The preceding embodiments provide methods for calculating the predicted frame size of I, P and B frames at one frame time beyond the current frame time t. A further embodiment was described in which scene cut information was used to better predict the frame size by removing data associated with frame times prior to a scene cut during a predictive window length. It will be appreciated in that both methods may be used together, the first embodiment, being used where no scene cuts occur in the predictive window and the second embodiment, being used when a scene cut occurs in the predictive window.

In some instances, it may be desirable to calculate a predicted bit rate for a frame time subsequent to a frame time t. Thus, in a third embodiment of the present invention, the following method may be utilized in calculating a predicted bit rate:

$$R^P(t+1)=Avg(R(t), \ldots R(t-T))+A$$

$$A=\lambda\delta(t-1)+(1-\lambda)\delta(t), 0<\lambda<1$$

$$\delta(t)=R(t)-R^P(t)$$

According to the present method, R(t), represents the bit rate during frame time t, such as in bits per second. The variable t represents the current discrete time slot for every frame time as earlier described. The variable T represents the predictive window length, such as the number of frame times to be used in calculating a predicted bit rate. For example, T=60 at t=200 would mean that the bit rates of the latest sixty (60) frame times would be used to predict the bit rate of a next frame time, i.e., frame times 169 through 200.

Avg(R(t), . . . R(t−T)) is the mathematical mean value of the bit rates for the frame times at frame time t through frame time t−T.

A represents an adaptive adjuster constant which basically acts to adjust the predicted bit rate, $R^P(t+1)$ based on differences between the actual measured bit rate R(t) of a frame time t that was also earlier predicted at $R^P(t)$.

To calculate A, both a predicted bit rate value $R^P(t)$ and the later measured bit rate value R(t) are needed. These values are differenced, and the difference, $\delta(t)$, is weighted and added to the weighted previous difference $\delta(t-1)$ according to a weighted summation. The weight of $\delta(t-1)$ and weighted $\delta(t)$ is according to the constant $\lambda$.

$R^P(t+1)$, or the predicted bit rate at t+1, is then calculated as the mathematical average of the bit rates of the frame times occurring during the predictive window length as adjusted by a weighted consideration of the error between the predicted bit rate and the later measured bit rate.

In a further embodiment, the predicted bit rate, $R^P(t+1)$, may also be calculated using scene cut information:

$$R^P(t+1)=Avg(R(t), \ldots R(t-T'))+A$$

$$T'=t-t_{cut}, \text{ where } T'<T$$

In this embodiment, the predictive window length is shortened due to the occurrence of a scene cut at frame time $t_{cut}$. T' is used rather than T, where $T'=t-t_{cut}$. Thus, bit rates associated with frame times prior to the scene cut are not utilized in predicting the bit rate of a frame time subsequent to the scene cut.

Although the above examples illustrate prediction of a frame size and bit rate, the predicted data may also include other data such as: average bandwidth; peak bandwidth needs of a channel; instantaneous bandwidth needs of a channel; rate of change of instantaneous bandwidth needs of channels; long term average bandwidth needs of a channel; long term variance of bandwidth needs of a channel; and video specific data. Further although the above examples discuss prediction of a single frame time beyond the current frame time t, the present invention may also be utilized to predict several frame times beyond the current frame time, or over a specified time period.

At process 810, the predicted data is communicated to the bandwidth allocator mechanism, e.g., scheduler/remultiplexer 614, for use in allocating bandwidth to the bit stream channels. In one embodiment, the predictor communicates the first data and the predicted data to the bandwidth allocating component of the statistical remultiplexer. In other embodiments, the predictor may combine the actual and predicted data, and provide this combined data to the bandwidth allocator mechanism as data representing the "effective" look-ahead window buffer(s) data. The bandwidth allocator mechanism then utilizes this data to further process the bit streams for output.

Thus, has been described methods and apparatus to improve the performance of a statistical remultiplexer by predicting data for an effectively "longer" look-ahead window using data obtained from portions of the bit streams present in the actual look-ahead window buffer(s).

The methods of the present invention may be implemented on various systems. For example, although the present invention has been described herein in relation to statistical remultiplexers, the present invention may be extended to other devices and systems utilizing a look-ahead windowing technique.

The present invention may be implemented as machine readable media that include program instructions, state information, etc., for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM).

The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While this invention has been described in terms of several preferred embodiments, there are alterations, permutations, and equivalents that fall within the scope of this invention which have been omitted for brevity's sake. The present invention is suitable for use on any transmission channel, and may be used to perform bandwidth sharing, despite the fact that the available bandwidth from the transmission facility, which includes but is not limited to, xDSL, ATM, and/or wireless channel, is sufficient to send the input compressed bit stream. It is therefore intended that the scope of the invention should be determined with reference to the appended claims.

Further, although a compressed bit stream typically comprises a multiplex of compressed audio, video and auxiliary data bit streams, the bit rate data described herein has primarily referred to compressed video data. Although not detailed, it is understood that any compressed audio and auxiliary data, such as compressed audio and auxiliary data related to the output of the video data, may also be the basis for bit rate data as described herein.

What is claimed is:

1. A network device for providing a remultiplexed compressed bit stream including video data, the network device comprising:
   at least one buffer for receiving at least a portion of one or more compressed bit streams, the at least one buffer being adapted for temporarily holding the portion of the one or more compressed bit streams;
   a data gathering module for gathering first data related to the portion of the one or more compressed bit streams present in the at least one buffer over a first time period; and
   a predictor coupled to the data gathering module, the predictor being adapted for generating second data related to the portion of the one or more compressed bit streams over a second time period, where the second data is generated using the first data, thereby enabling bandwidth to be allocated to the one or more compressed bit streams based upon the first and second data.

2. The network device as recited in claim 1, wherein the first time period is instantaneous.

3. The network device as recited in claim 1, wherein the second time period is instantaneous.

4. The network device as recited in claim 1, wherein the second time period is subsequent to the first time period.

5. The network device as recited in claim 1, wherein the predictor generates the second data using a mathematical formula.

6. The network device as recited in claim 1, wherein the predictor generates the second data by extrapolation.

7. The network device of claim 1, further comprising:
   a bandwidth allocator coupled to the predictor, the bandwidth allocator adapted for determining a bandwidth to be allocated to the one or more compressed bit streams present in the at least one buffer based upon the first and second data.

8. The network device of claim 7, further comprising:
   a multiplexer coupled to the bandwidth allocator, the multiplexer being adapted for combining the portion of the one or more compressed bit streams present in the at least one buffer during the first time period according to the bandwidth allocated by the bandwidth allocator and for outputting a single bit stream over a channel.

9. The network device of claim 1, wherein the network device is a statistical remultiplexer.

10. The network device of claim 1, wherein the first data comprises at least one of bit rate, average bandwidth, peak bandwidth, instantaneous bandwidth, rate of change of instantaneous bandwidth, long term average bandwidth, long term variance of bandwidth, or video specific data.

11. The network device of claim 10, wherein the video specific data comprises at least one of frame type, frame size, frame rates, frame patterns, timing, or stuffing data bits.

12. The network device of claim 1 wherein the second data comprises at least one of bit rate, average bandwidth, peak bandwidth, instantaneous bandwidth, rate of change of instantaneous bandwidth, long term average bandwidth, long term variance of bandwidth, or video specific data.

13. A method for allocating bandwidth in a network device, the method comprising:
   receiving at least a portion of one or more bit streams into a buffer, the buffer for temporarily holding a portion of the one or more bit streams over a first time period;
   gathering first data related to the portion of the one or more bit streams present in the buffer over the first time period; and
   generating second data related to the portion of the one or more bit streams over a second time period using the first data, thereby enabling bandwidth to be allocated to the one or more bit streams based upon the first and second data, wherein the second data is predicted data, wherein the bit stream are compressed bit streams and wherein the second time period is subsequent to the first time period.

14. The method as recited in claim 13, wherein the first time period is instantaneous.

15. The method as recited in claim 13, wherein the second time period is instantaneous.

16. The method as recited in claim 13, further comprising:
   allocating bandwidth to the one or more bit streams based upon the first and second data.

17. The method of claim 13, wherein the first data comprises at least one of bit rate, average bandwidth, peak bandwidth, instantaneous bandwidth, rate of change of instantaneous bandwidth, long term average bandwidth, long term variance of bandwidth, or video specific data.

18. The method of claim 17, wherein the video specific data comprises at least one of frame type, frame rates, frame size, frame patterns, timing, or stuffing data bits.

19. The method of claim 13, wherein the second data comprises at least one of bit rate, average bandwidth, peak bandwidth, instantaneous bandwidth, rate of change of instantaneous bandwidth, long term average bandwidth, long term variance of bandwidth, or video specific data.

20. A method for allocating bandwidth in a network device, the method comprising:
   receiving at least a portion of one or more bit streams into a buffer, the buffer for temporarily holding a portion of the one or more bit steams over a first time period;
   gathering first data related to the portion of the one or more bit streams present in the buffer over the first time period; and
   generating second data related to the portion of the one or more bit streams over a second time period using the first data, thereby enabling bandwidth to be allocated to the one or more bit streams based upon the first and second data, wherein generating second data comprises:
   generating the second data using a mathematical formula.

21. A method for allocating bandwidth in a network device, the method comprising:
 receiving at least a portion of one or more bit streams into a buffer, the buffer for temporarily holding a portion of the one or more bit streams over a first time period, gathering first data related to the portion of the one or more bit streams present in the buffer over the first time period; and
 generating second data related to the portion of the one or more bit streams over a second time period using the first data, thereby enabling bandwidth to be allocated to the one or more bit streams based upon the first and second data, wherein generating second data comprises:
 generating the second data by extrapolation.

22. A computer readable medium containing executable computer program instructions which when executed by a digital processing system cause the system to perform a method for allocating bandwidth in a network device, comprising:
 instructions for receiving at least a portion of one or more bit streams into a buffer, the buffer for temporarily holding a portion of the one or more bit streams over a first time period;
 instructions for gathering first data related to the portion of the one or more bit streams present in the buffer over the first time period; and
 instructions for generating second data related to the portion of the one or more bit streams over a second time period using the first data, thereby enabling bandwidth to be allocated to the one or more bit streams based upon the first and second data, wherein the second data is predicted data, wherein the first data comprises at least one of bit rate, average bandwidth, peak bandwidth, instantaneous bandwidth, rate of change of instantaneous bandwidth, long term average bandwidth, long term variance of bandwidth, or video specific data.

23. The computer readable medium of claim 22, wherein the video specific data comprises at least one of frame type, frame rates, frame patterns, timing, or stuffing data bits.

24. The computer readable medium of claim 22, wherein the second data comprises at least one of bit rate, average bandwidth, peak bandwidth, instantaneous bandwidth, rate of change of instantaneous bandwidth, long term average bandwidth, long term variance of bandwidth, or video specific data.

25. A network device for providing a remultiplexed compressed bit stream including video data over a transmission channel, the network device comprising:
 means for receiving at least a portion of one or more compressed bit streams and for temporarily holding the portion of the one or more compressed bit streams;
 means for gathering first data related to the portion of the one or more compressed bit streams over a first time period; and
 means for generating second data related to the portion of the one or more compressed bit streams over a second time period, wherein the second data is generated using the first data, thereby enabling bandwidth to be allocated to the one or more compressed bit streams based upon the first and second data, wherein the second data is predicted data, wherein the second time period is subsequent to the first time period.

26. The network device of claim 25, further comprising:
 means for determining a bandwidth to be allocated to the one or more compressed bit streams based upon the first and second data.

27. The network device of claim 25, further comprising:
 means for combining the portion of the one or more compressed bit streams according to the determined bandwidth allocation and for outputting a single bit stream over a channel.

28. The network device of claim 25, wherein the first data comprises at least one of bit rate, average bandwidth, peak bandwidth, instantaneous bandwidth, rate of change of instantaneous bandwidth, long term average bandwidth, long term variance of bandwidth, or video specific data.

29. The network device of claim 25 wherein the second data comprises at least one of bit rate, average bandwidth, peak bandwidth, instantaneous bandwidth, rate of change of instantaneous bandwidth, long term average bandwidth, long term variance of bandwidth, or video specific data.

30. A network device for providing a remultiplexed compressed bit stream including video data over a transmission channel, the network device comprising:
 means for receiving at least a portion of one or more compressed bit streams and for temporarily holding the portion of the one or more compressed bit streams;
 means for gathering first data related to the portion of the one or more compressed bit streams over a first time period; and
 means for generating second data related to the portion of the one or more compressed bit streams over a second time period, wherein the second data is generated using the first data, thereby enabling bandwidth to be allocated to the one or more compressed bit streams based upon the first and second data, wherein the second data is generated using a mathematical formula.

31. A network device for providing a remultiplexed compressed bit stream including video data over a transmission channel the network device comprising:
 means for receiving at least a portion of one or more compressed bit streams and for temporarily holding the portion of the one or more compressed bit streams;
 means for gathering first data related to the portion of the one or more compressed bit streams over a first time period; and
 means for generating second data related to the portion of the one or more compressed bit streams over a second time period, wherein the second data is generated using the first data, thereby enabling bandwidth to be allocated to the one or more compressed bit streams based upon the first and second data, wherein the second data is generated by extrapolation.

* * * * *